United States Patent
Ricciardi et al.

(10) Patent No.: US 9,584,561 B2
(45) Date of Patent: *Feb. 28, 2017

(54) METHOD AND APPARATUS FOR PROVIDING A NETWORK ASSISTING SWITCH FUNCTION

(71) Applicant: AT&T Intellectual Property I, L.P., Atlanta, GA (US)

(72) Inventors: Dominic Ricciardi, Bridgewater, NJ (US); Wesley Brush, Bricktown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,068

(22) Filed: Aug. 24, 2015

(65) Prior Publication Data

US 2015/0365445 A1    Dec. 17, 2015

Related U.S. Application Data

(63) Continuation of application No. 12/186,483, filed on Aug. 5, 2008, now Pat. No. 9,118,688.

(51) Int. Cl.
| | |
|---|---|
| H04L 12/28 | (2006.01) |
| H04L 12/66 | (2006.01) |
| H04L 12/56 | (2006.01) |
| H04L 29/06 | (2006.01) |
| H04M 7/00 | (2006.01) |
| H04Q 3/00 | (2006.01) |
| H04L 12/937 | (2013.01) |

(52) U.S. Cl.
CPC ........ *H04L 65/1069* (2013.01); *H04L 49/253* (2013.01); *H04L 65/104* (2013.01); *H04L 65/1096* (2013.01); *H04M 7/006* (2013.01); *H04M 7/0012* (2013.01); *H04Q 3/0045* (2013.01)

(58) Field of Classification Search
CPC ......... H04L 49/25; H04L 49/20; H04L 49/00; H04L 143/50; H04L 149/10; H04L 49/35
See application file for complete search history.

(56) References Cited

U.S. PATENT DOCUMENTS

| | | | |
|---|---|---|---|
| 4,611,096 | A | 9/1986 | Asmuth et al. |
| 5,490,135 | A | 2/1996 | Hiraiwa et al. |
| 6,625,143 | B1 | 9/2003 | Kamiya et al. |
| 2004/0033809 | A1 | 2/2004 | Smith et al. |
| 2004/0058665 | A1* | 3/2004 | Batni ............... H04Q 3/005 455/403 |
| 2005/0068942 | A1 | 3/2005 | Chu et al. |

(Continued)

*Primary Examiner* — Parth Patel
*Assistant Examiner* — Jason Harley

(57) ABSTRACT

A method and apparatus for providing a network assisting switch function are disclosed. For example, the method receives a query for feature processing for a call from a switch deployed in a switched network, and determines if the feature processing for the call requires one or more switching services. The method determines if the switch is able to provide the one or more switching services, if the one or more switching services are determined to be required, and initiates a temporary connection to a network assisting switch function in a packet network, if the switch is unable to provide the one or more switching services.

20 Claims, 4 Drawing Sheets

(56) References Cited

U.S. PATENT DOCUMENTS

2005/0180390 A1\* 8/2005 Baruzzi .............. H04L 12/5692
  370/351
2007/0133575 A1\* 6/2007 Cai .................... H04L 12/6418
  370/401

\* cited by examiner

METHOD AND APPARATUS FOR PROVIDING A NETWORK ASSISTING SWITCH FUNCTION

This application is a continuation of U.S. patent application Ser. No. 12/186,483, filed Aug. 5, 2008, now U.S. Pat. No. 9,118,688, which is herein incorporated by reference in its entirety.

The present invention relates generally to communication networks and, more particularly, to a method and apparatus for providing a network assisting switch function in a packet network, e.g., Internet Protocol (IP) network, Voice over Internet Protocol (VoIP) network, and the like.

BACKGROUND OF THE INVENTION

A customer may subscribe to a service with a switch function from a network service provider. For example, a customer may subscribe to one or more of a Wide Area Telecommunications Service (WATS) such as a toll-free service, an automatic speech recognition service, a mass calling announcement service, a Dual Tone Multi-Frequency (DTMF) digit collection service, etc. The service processing, call processing, and call control for these types of services typically reside in a Class-4 switch that has Interactive Voice Response (IVR) functionality. However, with the growth of the Internet, Class-4 switches are becoming more and more unpopular, and comparatively more costly to deploy. It is currently necessary to maintain a large embedded base of the Class-4 switches due to the extremely high initial replacement cost.

SUMMARY OF THE INVENTION

In one embodiment, the present invention discloses a method and apparatus for providing a network assisting switch function via a packet network. For example, the method receives a query for feature processing for a call from a switch deployed in a switched network, and determines if the feature processing for the call requires one or more switching services. The method determines if the switch is able to provide the one or more switching services, if the one or more switching services are determined to be required, and initiates a temporary connection to a network assisting switch function in a packet network, if the switch is unable to provide the one or more switching services. Using this method will also expand the service capabilities using the packet network that are technologically unfeasible to be provided by the Class-4 switch network alone. This allows the provider to offer more sophisticated service offerings using the combined Class-4 and packet networks.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
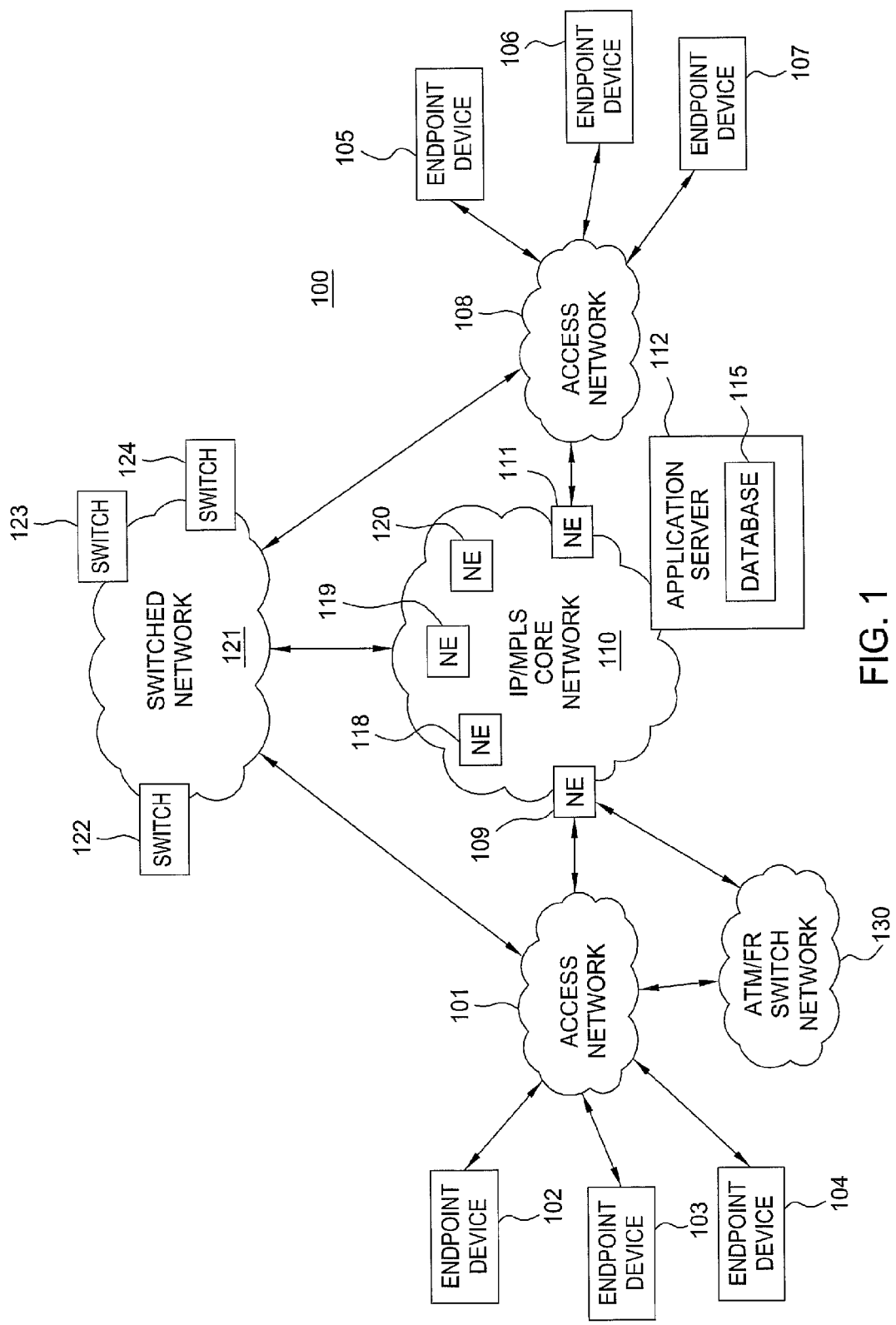
FIG. 1 illustrates an exemplary network related to the present invention.

The present invention broadly discloses a method and apparatus for providing a network assisting switch function (and for additional feature capabilities not available on the Class-4 switch network) on a packet network, e.g., an Internet Protocol (IP) network and the like. FIG. 1 is a block diagram depicting an exemplary network 100 related to the current invention. Exemplary networks include switched networks, Internet protocol (IP) networks, Asynchronous Transfer Mode (ATM) networks, frame-relay networks, and the like.

A switched network is broadly defined as a network that creates continuous pathways between callers and called parties by disconnecting and reconnecting lines in various configurations (i.e. by switching). ATM, frame-relay and IP networks, etc. are packet based networks. An IP network is broadly defined as a network that uses Internet Protocol such as IPv4 or IPv6 and the like to exchange data packets.

In one embodiment, the network 100 may comprise a plurality of endpoint devices 102-104 configured for communication with the core packet network 110 (e.g., an IP based core backbone network supported by a service provider) or the switched network 121. The endpoint devices 102-104 may communicate with the switched network 121 and/or the IP/MPLS core network 110 via an access network 101. Similarly, a plurality of endpoint devices 105-107 are configured for communication with the core packet network 110 and/or the switched network 121 via an access network 108. The switched network 121 and the IP/MPLS core network 110 are connected to enable calls to originate in either network and complete in either network seamlessly. For example, a Gigabit switched router in the IP network may be connected to an edge switch 122, 123, 124 in the switched network.

The network elements 109 and 111 may serve as gateway servers or edge routers for the IP/MPLS core network 110. Switches 122-124 may serve as switches or edge switches for the switched network 121.

The endpoint devices 102-107 may comprise customer endpoint devices such as personal computers, laptop computers, Personal Digital Assistants (PDAs), Next Generation Internet Devices e.g., IPhone, servers, routers, and the like. The access networks 101 and 108 serve as a means to establish a connection between the "endpoint devices 102-107" and "one or more of the NEs 109 and 111, and the switches 122-124." The access networks 101 and 108 may each comprise a Digital Subscriber Line (DSL) network, a broadband cable access network, a Local Area Network (LAN), a Wireless Access Network (WAN), a $3^{rd}$ party network, and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection to the IP/MPLS core network 110 is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 contains Layer 2 switches functioning as Provider Edge Routers (PER) and/or Provider Routers (PR). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109 and 111) reside at the edge of the IP/MPLS core infrastructure and interface with customer endpoints over various types of access networks. An NE that resides at the edge of a core infrastructure is typically implemented as an edge router, a media gateway, a border element, a firewall, a switch, and the like. An NE may also reside within the IP network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements, one application server and so on are depicted in FIG. 1, the communication system 100 may be expanded by including additional endpoint devices, access networks, network elements, $3^{rd}$ party networks, application servers, etc. without altering the scope of the present invention.

The above IP network is described to provide an illustrative environment in which packets for voice and data services are transmitted on switched and/or packet networks. For example, a customer may subscribe to one or more of a Wide Area Telecommunications Service (WATS) such as a toll-free service, an automatic speech recognition service, a mass calling announcement service, a Dual Tone Multi-Frequency (DTMF) digit collection service, etc.

In one embodiment, the present invention provides a method for providing a network assisting switch function on a packet network, e.g., an Internet Protocol (IP) network. The service processing, call processing, and call control for the types of services that require the network assisting switch function of the current method may reside in a Class-4 switch, while the network assisting switch function, e.g., an announcement, a service that requires an Interactive Voice Response (IVR), etc., is provided in the IP network. In order to clearly describe the current invention, the following networking terminologies and concepts are first provided:

A switched network;
A Class-4 central office;
A Class-5 central office;
Class-4 Electronic Switching System (4ESS);
Class-5 Electronic Switching System (5ESS);
Signaling System 7 (SS7)
Signal Transfer Point (STP)
Direct Services Dialing-Network Control Point (DSD-NCP);
Service Assist and Service Handoff; and
Transaction Capabilities Application Part (TCAP).

A switched network refers to a network that interconnects Class-4 and Class 5 central offices as described below. The switching is accomplished by disconnecting and reconnecting lines in different configurations to enable a continuous pathway to be set up between a sender and a recipient. Class 4 offices, Class 5 offices, and the Network Control Points communicate via a SS7 Signaling network consisting of STP's.

A Class-4 central office refers to a switching center for toll calls. A Class-4 office, switches toll traffic originating at Class 5 offices to other Class-4 offices, or to offices of a higher class. A Class-4 office also relays toll traffic from a Class-4 toll office, to a Class 5 office serving a destination address. As Class 5 offices provide "Local Services", a Class 4 Toll office also provides Custom Toll Services.

A Class-5 central office refers to the lowest level in a hierarchy of central offices. A Class 5 office serves as a network entry point for customer access lines. Class 5 central offices are also switching centers for local calls.

Class-4 Electronic Switching System (4ESS) refers to a switch used mainly in Class-4 offices. 4ESS is also referred to as simply a Class-4 switch.

Class-5 Electronic Switching System (5ESS) refers to a switch used in class 5 offices, and sometimes in offices too small for Class-4 switches.

Direct Services Dialing-Network Control Point (DSD-NCP) is a database that contains customer profile information in a switched network. The profile information includes customer instructions regarding the handling of their calls, among other things. For example, the Network Control Point (NCP) stores the customer's preferred call routing and handling specifications. To comply with the customer's specifications, the DSD-NCP may gather any additional information that may be needed, by instructing a switch, e.g., a 4ESS switch, to play appropriate announcements and collect digits. For example, the DSD-NCP may contain information gathered from a caller as a result of the toll-free customer's instructions for handling calls.

Service Assist and Service Handoff refer to types of call handling in which one or more call handling capabilities unavailable at a first central office are performed at another central office under the control of the NCP. For example, if a Class-4 or Class 5 switch is unable to perform a capability required to process a call in accordance with the contents of the DSD-NCP (described above), the NCP may select another switch to perform the capability. The call is routed from the first office to the second office under control of the NCP and the second office performs one or more of the call processing capabilities under control of the NCP. Service Assist refers to handling of the call in which the call processing is returned back to the first office after the capability (unavailable at the first office) is performed at the second office. On the contrary, if the call processing is completely turned over to the second office, the call handling is referred to as a Service Handoff.

Transaction Capabilities Application Part (TCAP) is a standard protocol for Signaling System 7 (SS7) networks used to enable multiple dialogs to occur between two endpoints by using transaction identifications for differentiation.

Figure 2:
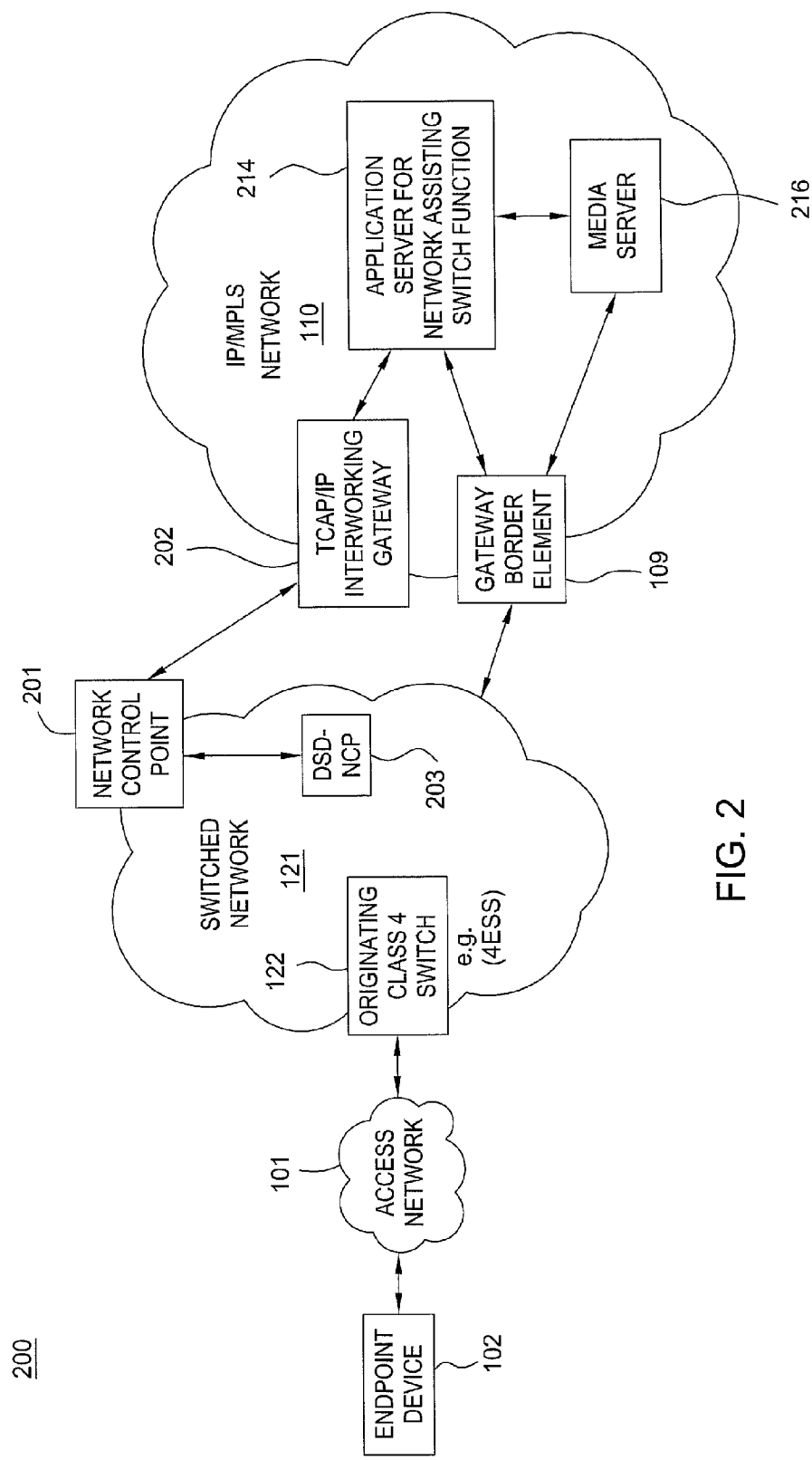
FIG. 2 illustrates an exemplary network for providing a network assisting switch function.

FIG. 2 illustrates an exemplary network 200 for providing a network assisting switch function. It should be noted that the network 200 is only provided as an illustrative network showing the network elements that are used to support the present invention. Additional network elements may exist in the network 200 that are not illustrated. A customer endpoint device 102 is communicating with a switched network 121 via an access network 101. For example, the switched network 121 may comprise a Class-4 switch 122 (e.g., a 4ESS switch), a Network Control Point (NCP) 201 and a DSD-NCP database 203. In one embodiment, the switched network is in communication with a core network 110. For example, the IP/MPLS core network 110 comprises an application server 214 for providing network assisting switch function, a border element 109, a TCAP/IP interworking gateway 202, and a media server 216. The border element 109 functions as a gateway for the IP/MPLS core network 110. In one embodiment, the switched network 121 accesses the IP/MPLS core network 110 via the gateway border element 109 and the NCP 201 communicates with the IP/MPLS core network 110 via the TCAP/IP interworking gateway 202.

When a 4ESS switch receives a call, the 4ESS switch queries the NCP for feature processing. For example, the 4ESS switch 122 may receive a call from the customer endpoint device 102. The 4ESS switch 122 may then query the NCP 201 for feature processing.

The NCP 201 receives the query for feature processing from the 4ESS and determines whether or not automatic speech recognition service, a mass calling announcement service, a DTMF digit collection service, etc. are required. If one or more of the switching services are required, the NCP 201 determines whether the 4ESS switch that originated the call (referred to as the originating 4ESS) has the required capabilities. For example, it may be determined that the 4ESS switch 122 may not have a required IVR function.

The NCP 201 then initiates a temporary connection to a network assisting switch function in the IP/MPLS core network. For example, the NCP may instruct the originating 4ESS switch 122 for a Service Assist/Handoff (SA/HO). The Service Assist/Handoff instructs the originating 4ESS switch to send a request to an application server for providing a network assisting switch function located in the VoIP network. For example, the Service Assist/Handoff may instruct the 4ESS switch 122 to request a service from the application server 214. The originating 4ESS switch sends the request to the application server 214 via the gateway border element 109. The gateway border element 109 forwards the request towards the application server 214. For example, the gateway border element 109 may send a Session Initiation Protocol (SIP) invite message to the application server 214 for providing the requested assisting switch functionality.

In one embodiment, the application server 214 providing the assisting switch functionality may not have the necessary data, e.g., service specific information or data such predefined announcements, etc. required to provide the service assistance for the call. Hence, the application server 214 may query the NCP 201 for the service assist data via the TCAP/IP interworking gateway 202.

The NCP 201 then provides the requested service assist data to the application server 214. That is, the NCP resumes service processing at the point it left off prior to sending the Service Assist-Handoff to the 4ESS switch 122.

The application server 214 then sets up the requested service on a media server 216. The application server 214 then sends a SIP invite to the gateway border element 109. The gateway border element 109 sends a SIP invite to the media server 216. When the media server 216 receives the SIP invite from the gateway border element 109, it fetches the requested content. For example, the media server 216 may play an announcement via an audio device, make a mass announcement, provide automatic speech recognition, and the like.

The application server 214 detects when the requested service is completed. For example, the application server 214 may determine when playing an announcement is completed. The application server then notifies the NCP 201 that the one or more requested services, via the temporary connection to the network assisting switch function in the IP network, are completed.

The NCP 201 then instructs the 4ESS switch 122 to take down the temporary connection. The 4ESS 122 takes down the temporary connection and the NCP and 4ESS resume the normal call processing. Thus, while a required announcement is accomplished via the network assisting switch located in the VoIP network, the 4ESS may resume processing the call.

Figure 3:
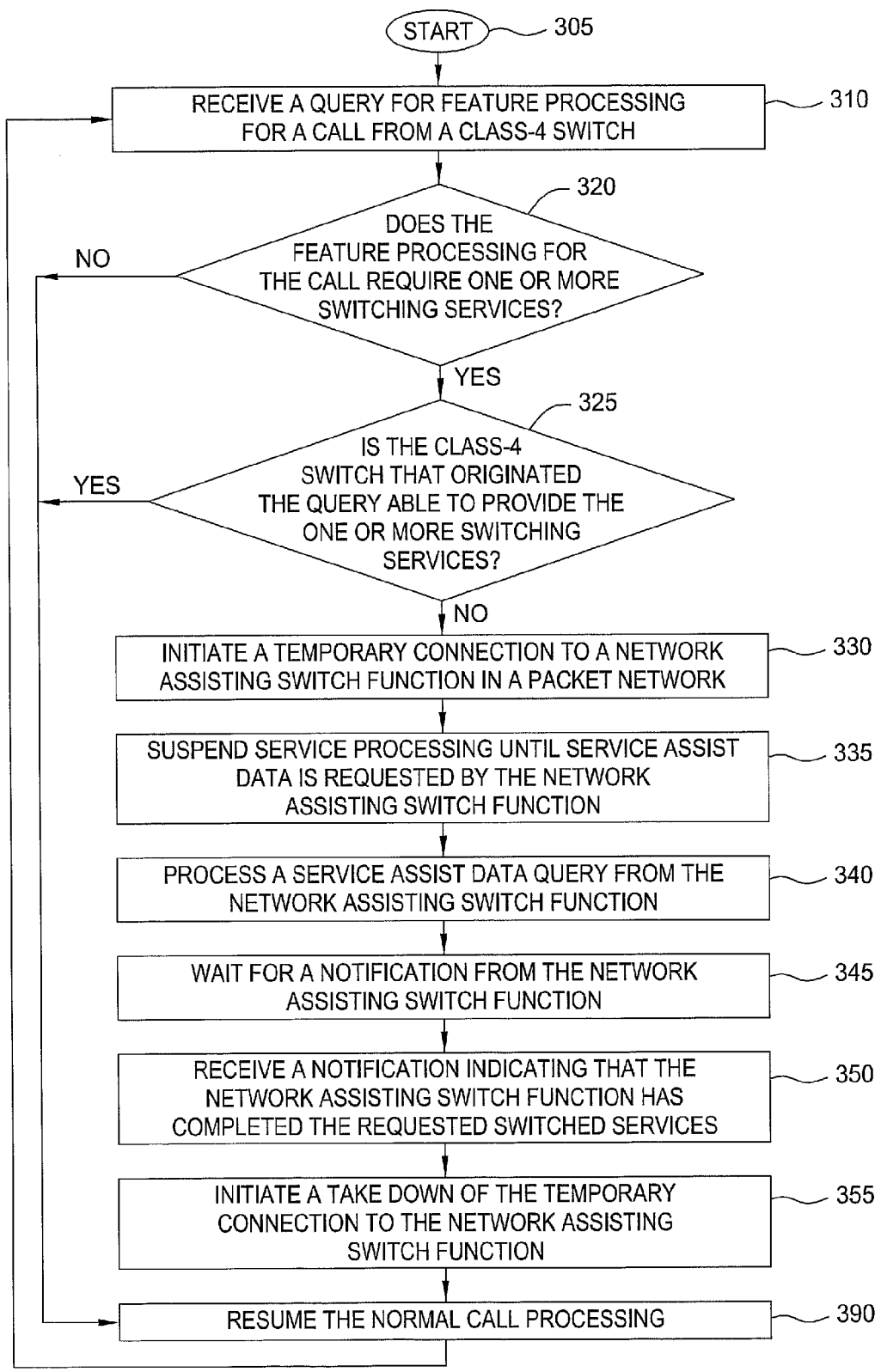
FIG. 3 illustrates a flowchart of a method for providing a network assisting switch function.

FIG. 3 illustrates a flowchart of a method 300 for providing network assisting switch function. For example, one or more steps of FIG. 3 can be implemented by the NCP. Method 300 starts in step 305 and proceeds to step 310.

In step 310, method 300 receives a query for feature processing for a call from a Class-4 switch. For example, an NCP receives a query from a 4ESS switch for feature processing.

In step 320, method 300 determines if the feature processing for the call requires one or more switching services. For example, the method determines if automatic speech recognition service, a mass calling announcement service, a Dual Tone Multi-Frequency (DTMF) digit collection service, etc. are required to process the call. If there are switching services that are required, the method proceeds to step 325. Otherwise, the method proceeds to step 390 to resume the normal call processing.

In step 320, method 300 determines if the Class-4 switch that originated the query is able to provide the one or more switching services. For example, the method determines if the 4ESS switch that originated the query has the required announcement capability, DTMF processing capability, IVR capability, mass announcement capability, and the like for processing the call. If the Class-4 switch is able to provide the one or more switching services, the method proceeds to step 390 to resume the normal call processing by the originating 4ESS. Otherwise, method 300 proceeds to step 330.

In step 330, method 300 initiates a temporary connection to a network assisting switch function in a packet network, e.g., an IP network, a VoIP network, and the like. For example, the NCP may instruct the originating 4ESS switch for a Service Assist/Handoff (SA/HO). The method then proceeds to step 335.

In step 335, method 300 suspends service processing until service assist data is requested by the network assisting switch function. In one embodiment, the data required to process the call is located in the switched network. In order to provide the requested assistance, the packet network will need to obtain the service assist data from the switched network. For example, the customer instructions for handling the call (IVR, mass announcement, DTMF digit input, etc.) are located in a database in the switched network.

The originating 4ESS switch may then send a request to an application server for providing a network assisting switch function located in the packet network. In turn, the application server may then query the NCP for the service assist data via a TCAP/IP interworking gateway.

In step 340, method 300 processes a service assist data query from the network assisting switch function. For example, the method receives a query from the application server providing the network assisting switch function. In turn, the method 300 provides the requested service assist data to the network assisting switch function. For example, the NCP sends a response to the query from the application server in the packet network. The method then proceeds to step 345.

In step 345, method 300 waits for a notification from the network assisting switch function. For example, the method waits for a notification indicating that the one or more requested network assisting switch services or functions, e.g., an automatic speech recognition service, a mass calling announcement service, a DTMF digit collection service, etc. have been completed.

Once the service assist data is received, the application server will perform the requested network assisting switch functions, e.g., via a media server in the packet network. When the application server detects that the requested service(s) is/are completed, the application server notifies the NCP.

In step 350, method 300 receives a notification indicating that the network assisting switch function has completed the requested switched services. For example, the method receives a notification indicating automatic speech recognition service, a mass calling announcement service, and/or a DTMF digit collection service, for the call are completed.

In step 355, method 300 initiates a take down of the temporary connection to the network assisting switch function. For example, the NCP instructs the 4ESS switch to take down the temporary connection to the application server. The 4ESS then takes down the temporary connection. The method then proceeds to step 390 to resume the normal call processing.

In step 390, method 300 resumes the normal call processing. For example, once the requested service is completed via the network assisting switch function located in the packet network, the 4ESS and the NCP may both resume processing the call. Furthermore, the method may also return to step 310 to process the next query.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
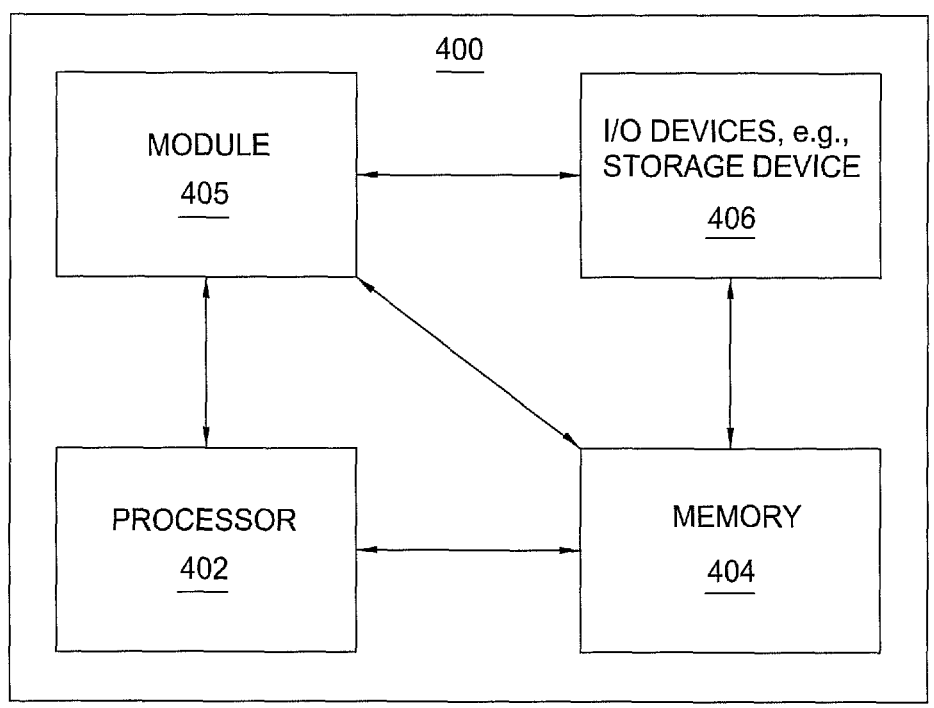
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing network assisting switch function, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing network assisting switch function can be loaded into memory 404 and executed by processor 402 to implement the functions as discussed above. As such, the present method 405 for providing network assisting switch function (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a network assisting switch function, the method comprising:
   receiving, via a processor of a network control point, a query for feature processing for a call, wherein the query is from a switch deployed in a switched network, wherein the switched network comprises a network that creates a continuous pathway between a source associated with the call and a destination associated with the call;
   determining, via the processor, the feature processing for the call requires a switching service;
   determining, via the processor, the switch is unable to provide the switching service, when the switching service is determined to be required;
   initiating, via the processor, a temporary connection to the network assisting switch function in a packet network, when the switch is unable to provide the switching service;
   receiving, via the processor, a query for service assist data from the network assisting switch function, in response to the switch sending a request to the network assisting switch function to perform the switching service that is not provided by the switch; and
   providing, via the processor, the service assist data to the network assisting switch function.

2. The method of claim 1, further comprising:
   waiting for a notification from the network assisting switch function that the switching service that is not provided by the switch has been completed; and
   resuming a normal call processing, upon receiving the notification.

3. The method of claim 2, further comprising:
   initiating a take down of the temporary connection to the network assisting switch function.

4. The method of claim 1, wherein the switching service comprises an automatic speech recognition service.

5. The method of claim 1, wherein the packet network comprises an Internet protocol network.

6. The method of claim 1, wherein the network control point is deployed in the switched network.

7. The method of claim 1, wherein the switch comprises a class-4 electronic switching system switch.

8. A non-transitory computer-readable medium storing a plurality of instructions which, when executed by a processor of a network control point, cause the processor to perform operations for providing a network assisting switch function, the operations comprising:
   receiving a query for feature processing for a call, wherein the query is from a switch deployed in a switched network, wherein the switched network comprises a network that creates a continuous pathway between a source associated with the call and a destination associated with the call;
   determining the feature processing for the call requires a switching service;
   determining the switch is unable to provide the switching service, when the switching service is determined to be required;
   initiating a temporary connection to the network assisting switch function in a packet network, when the switch is unable to provide the switching service;
   receiving a query for service assist data from the network assisting switch function, in response to the switch sending a request to the network assisting switch function to perform the switching service that is not provided by the switch; and providing the service assist data to the network assisting switch function.

9. The non-transitory computer-readable medium of claim 8, the operations further comprising:

waiting for a notification from the network assisting switch function that the switching service that is not provided by the switch has been completed; and resuming a normal call processing, upon receiving the notification.

10. The non-transitory computer-readable medium of claim 9, the operations further comprising:

initiating a take down of the temporary connection to the network assisting switch function.

11. The non-transitory computer-readable medium of claim 8, wherein the switching service comprises an automatic speech recognition service.

12. The non-transitory computer-readable medium of claim 8, wherein the packet network comprises an internet protocol network.

13. The non-transitory computer-readable medium of claim 8, wherein the network control point is deployed in the switched network.

14. The non-transitory computer-readable medium of claim 8, wherein the switch comprises a class-4 electronic switching system switch.

15. An apparatus for providing a network assisting switch function, the apparatus comprising:

a processor of a network control point; and a computer-readable medium storing a plurality of instructions which, when executed by the processor, cause the processor to perform operations, the operations comprising:

receiving a query for feature processing for a call, wherein the query is from a switch deployed in a switched network, wherein the switched network comprises a network that creates a continuous pathway between a source associated with the call and a destination associated with the call;

determining the feature processing for the call requires a switching service;

determining the switch is unable to provide the switching service, when the switching service is determined to be required;

initiating a temporary connection to the network assisting switch function in a packet network, when the switch is unable to provide the switching service;

receiving a query for service assist data from the network assisting switch function, in response to the switch sending a request to the network assisting switch function to perform the switching service that is not provided by the switch; and providing the service assist data to the network assisting switch function.

16. The apparatus of claim 15, the operations further comprising:

waiting for a notification from the network assisting switch function that the switching service that is not provided by the switch has been completed; and resuming a normal call processing, upon receiving the notification.

17. The apparatus of claim 16, the operations further comprising:

initiating a take down of the temporary connection to the network assisting switch function.

18. The apparatus of claim 15, wherein the switching service comprises an automatic speech recognition service.

19. The apparatus of claim 15, wherein the packet network comprises an internet protocol network.

20. The apparatus of claim 15, wherein the network control point is deployed in the switched network.

* * * * *